(12) United States Patent
Ziyaee et al.

(10) Patent No.: US 10,860,034 B1
(45) Date of Patent: Dec. 8, 2020

(54) BARRIER DETECTION (71) Applicants: Tarin Ziyaee, San Francisco, CA (US); Tarek El-Gaaly, San Francisco, CA (US)

(72) Inventors: Tarin Ziyaee, San Francisco, CA (US); Tarek El-Gaaly, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 145 days.

(21) Appl. No.: 16/126,085

(22) Filed: Sep. 10, 2018

Related U.S. Application Data (60) Provisional application No. 62/563,690, filed on Sep. 27, 2017.

(51) Int. Cl.
| | |
|---|---|
| *G01C 21/36* | (2006.01) |
| *B60Q 9/00* | (2006.01) |
| *G06K 9/00* | (2006.01) |
| *G01S 17/00* | (2020.01) |
| *G06T 11/00* | (2006.01) |
| *G06T 15/00* | (2011.01) |
| *G06T 17/00* | (2006.01) |
| *G05D 1/02* | (2020.01) |
| *G05D 1/00* | (2006.01) |
| *G06K 9/62* | (2006.01) |
| *G06N 3/08* | (2006.01) |

(52) U.S. Cl.
CPC ......... *G05D 1/0274* (2013.01); *G05D 1/0088* (2013.01); *G05D 1/0221* (2013.01); *G05D 1/0248* (2013.01); *G06K 9/00805* (2013.01); *G06K 9/6262* (2013.01); *G06N 3/08* (2013.01)

(58) Field of Classification Search
None
See application file for complete search history.

(56) References Cited

U.S. PATENT DOCUMENTS

| | | |
|---|---|---|
| 9,286,524 B1 | 3/2016 | Mei et al. |
| 2014/0300758 A1 | 10/2014 | Tran |
| 2015/0269439 A1 | 9/2015 | Versace et al. |
| 2015/0344028 A1* | 12/2015 | Gieseke ............... B62D 15/028 701/1 |
| 2016/0019458 A1 | 1/2016 | Kaufhold |
| 2016/0054452 A1 | 2/2016 | Cosatto et al. |
| 2016/0217335 A1 | 7/2016 | Levi et al. |
| 2016/0378117 A1 | 12/2016 | Szatmary et al. |

(Continued)

FOREIGN PATENT DOCUMENTS

| | | |
|---|---|---|
| CN | 105892471 A | 8/2016 |
| DE | 102016207209 A1 | 11/2016 |

(Continued)

*Primary Examiner* — Adam D Tissot
(74) *Attorney, Agent, or Firm* — Young Basile Hanlon & MacFarlane, P.C.

(57) ABSTRACT

Systems and methods for barrier detection using birds-eye-view maps of lidar data. Some implementations may include receiving lidar data from a lidar sensor; determining, based on the lidar data, a birds-eye-view map of one or more objects that are reflected in the lidar data; and inputting the birds-eye-view map to a machine learning system to obtain a classified map wherein the one or more objects are labeled with respective classifications from a set of classes including a dynamic class and static class.

20 Claims, 7 Drawing Sheets

(56) References Cited

U.S. PATENT DOCUMENTS

| | | |
|---|---|---|
| 2017/0008168 A1 | 1/2017 | Weng et al. |
| 2017/0015317 A1 | 1/2017 | Fasola et al. |
| 2017/0024877 A1 | 1/2017 | Versace et al. |
| 2017/0032222 A1 | 2/2017 | Sharma et al. |
| 2017/0039436 A1 | 2/2017 | Chen et al. |
| 2017/0076438 A1* | 3/2017 | Kottenstette ........... G06K 9/627 |
| 2017/0248963 A1* | 8/2017 | Levinson ............... B60Q 9/008 |
| 2019/0094040 A1* | 3/2019 | Lewis ................ G06K 9/00805 |

FOREIGN PATENT DOCUMENTS

| | | |
|---|---|---|
| WO | 2016100814 A1 | 6/2016 |
| WO | 2016118501 A1 | 7/2016 |
| WO | 2016172188 A1 | 10/2016 |
| WO | 2017040691 A1 | 3/2017 |

\* cited by examiner

BARRIER DETECTION

CROSS-REFERENCE TO RELATED APPLICATIONS

This application claims the benefit of U.S. Provisional Application No. 62/563,690, filed on Sep. 27, 2017, the content of which is hereby incorporated by reference in its entirety for all purposes.

TECHNICAL FIELD

This disclosure relates to barrier detection.

BACKGROUND

Automated systems gather process large quantities of sensor data to identify objects in the surrounding environment. The processing of sensor data is often subject to a real-time constraint to facilitate navigation and robust control of the automated system.

SUMMARY

Disclosed herein are implementations of barrier detection.

In a first aspect, the subject matter described in this specification can be embodied in systems that include a body, actuators operable to cause motion of the body, and a lidar sensor configured to detect objects in a space near the system. The systems include an automated controller configured to receive lidar data from the lidar sensor; determine, based on the lidar data, a birds-eye-view map of one or more objects that are reflected in the lidar data; input the birds-eye-view map to a convolutional neural network to obtain a classified map in which the one or more objects are labeled with respective classifications from a set of classes including a dynamic class and static class; pass the classified map to an object tracker that is configured to track dynamic objects moving in an environment; determine a motion plan based in part on the object tracking data from the object tracker; and output commands to the actuators to maneuver the system, wherein the commands are based on the motion plan.

In a second aspect, the subject matter described in this specification can be embodied in systems that include a lidar sensor, a data processing apparatus, and a data storage device. The data storage device stores instructions executable by the data processing apparatus that upon execution by the data processing apparatus cause the data processing apparatus to perform operations comprising: receiving lidar data from the lidar sensor; determining, based on the lidar data, a birds-eye-view map of one or more objects that are reflected in the lidar data; and inputting the birds-eye-view map to a convolutional neural network to obtain a classified map in which the one or more objects are labeled with respective classifications from a set of classes including a dynamic class and static class.

In a third aspect, the subject matter described in this specification can be embodied in methods that include receiving lidar data from a lidar sensor; determining, based on the lidar data, a birds-eye-view map of one or more objects that are reflected in the lidar data; and inputting the birds-eye-view map to a machine learning system to obtain a classified map wherein the one or more objects are labeled with respective classifications from a set of classes including a dynamic class and static class.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Lidar data from a lidar sensor can offer high resolution information about the locations of objects in a space near the lidar sensor. Lidar data representations are automatically immune to day/night optical lighting variations. For example, lidar data may be used by an automated vehicle controller to detect objects in the environment of the vehicle and this information can be used for navigation and/or motion planning in a dynamic environment. Lidar data may be available in three-dimensional point cloud format. Lidar data can be sparse and difficult to process efficiently in a three-dimensional format.

Lidar data may be projected into a birds-eye-view map, which is a two-dimensional image that indicates in which areas of the map objects have been detected. For example, elements of a birds-eye-view map may include binary indications of whether any objects have been detected in a space above a corresponding area or cell of a ground plane. In some implementations, a birds-eye-view map may include rich complementary information, such as height information (e.g., height histograms), lidar intensity data for points that have been projected onto an area, and/or point counts for an area.

These two-dimensional birds-eye-view maps may be efficiently processed using image processing techniques to classify detected objects as dynamic or static. For example, a birds-eye-view map may be input to a machine learning system (e.g., a convolutional neural network) to obtain a classified map that labels objects detected in the space with classifications (e.g., static or dynamic). This object classification data can be used as a mask for down-stream object trackers and/or map localizers. Analysis of these birds-eye-view maps may enable improvements in accuracy and efficiency of object recognition and tracking, which may in turn improve performance of automated vehicle control systems.

Figure 1:
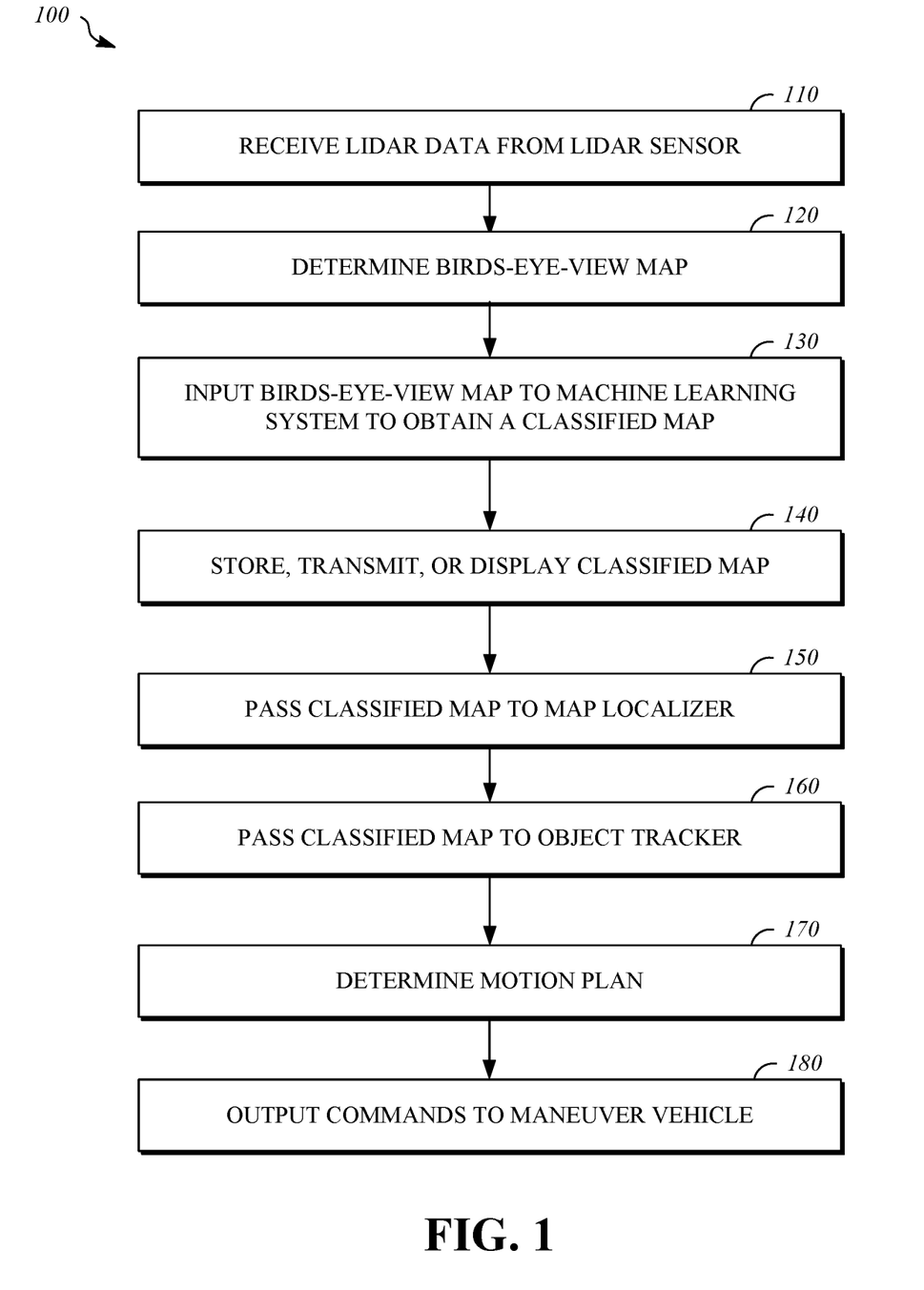
FIG. 1 is a flowchart of an example technique for using lidar data to classify objects in an environment.

FIG. 1 is a flowchart of an example of a technique 100 for using three-dimensional measurement data, such as lidar data, to classify objects in an environment. Although the description herein is made with respect to lidar data, it should be understood that other sensor technologies that output similar information (e.g., a three-dimensional point cloud representing locations of features in an environment) can be used.

The technique 100 includes receiving lidar data from a lidar sensor in operation 110; determining, based on the lidar data, a birds-eye-view map of one or more objects in an area that are reflected in the lidar data in operation 120; inputting the birds-eye-view map to a machine learning system to obtain a classified map in which the one or more objects are labeled with respective classifications from a set of classes including a dynamic class and static class in operation 130; storing transmitting, or displaying the classified map in operation 140; passing the classified map to a map localizer that is configured to update a navigation map based on local sensor data in operation 150; passing the classified map to an object tracker that is configured to track dynamic objects moving in an environment in operation 160; determining a motion plan based in part on the object tracking data from the object tracker in operation 170; and outputting commands to the actuators to maneuver a vehicle in operation 180, wherein the commands are based on the motion plan. For example, the technique 100 may be implemented by a vehicle, such as the vehicle 400 of FIG. 4. For example, the technique 100 may be implemented by a vehicle controller, such as the vehicle controller 500 of FIG. 5. For example, the technique 100 may be implemented by a computing device, such as the computing device 600 of FIG. 6.

The technique 100 includes receiving lidar data from a lidar sensor in operation 110. In some implementations, the lidar data may include a three-dimensional point cloud. For example, a point from a point cloud may record a lidar measurement of backscattered light from an object at a corresponding location. For example, points in a three-dimensional point cloud may be associated with a location in three-dimensional space relative to a lidar sensor and a lidar intensity. For example, the lidar data may be received from the lidar sensor 450 in operation 110. For example, the lidar data may be received in operation 110 via the lidar sensor interface 530. For example, the lidar data may be received in operation 110 via the wireless interface 630.

The technique 100 includes determining in operation 120, based on the lidar data, a birds-eye-view map of one or more objects that are reflected in the lidar data. In some implementations, determining the birds-eye-view map in operation 120 includes projecting a three-dimensional point cloud of the lidar data onto a plane. For example, the plane of the birds-eye-view map may be a plane orthogonal to a vertical axis of the lidar sensor or a vehicle. In some implementations, the plane of the birds-eye-view map may be a plane orthogonal to a gravitational acceleration (e.g., sensed using an accelerometer, a gyroscope, and/or a magnetometer). In some implementations, points of a three-dimensional point cloud are omitted from the projection if they are below a height (e.g., a directed distance from the plane of the birds-eye-view map) that is below a threshold, which may be associated with a ground level. For example, a technique 200 of FIG. 2 may be implemented as part of determining 120 a birds-eye-view map, as will be described herein.

A plane of a birds-eye-view map may be partitioned into cells (e.g., blocks or other areas) at a resolution (e.g., 5×5 cm blocks or 10×10 cm blocks). The birds-eye-view map may include elements that are binary indications of whether an object is detected at respective locations. In some implementations, binary values may be determined in operation 120 and associated with respective cells of the birds-eye-view map. For example, the binary values of respective elements may indicate whether any points of a three-dimensional point cloud of lidar data have been projected onto respective cells of the plane of the birds-eye-view map. For example, the birds-eye-view map may be in the format of the birds-eye-view map 800 of FIG. 8. In some implementations, height data (e.g., a maximum height, a minimum height, an average height, a median height, a height histogram, or an array of heights) for points that have been projected onto a cell may be associated with the cell. For example, the birds-eye-view map includes elements that are maximum heights of objects detected at respective locations (e.g., projected onto a cell). For example, the birds-eye-view map includes elements that are height histograms of objects detected at respective locations (e.g., projected onto a cell). In some implementations, the birds-eye-view map includes elements that are point counts of objects detected at respective locations. For example, the birds-eye-view map may include counts of points that have been projected onto a respective cell of the plane of the birds-eye-view map. In some implementations, the birds-eye-view map includes elements that are lidar intensity values for objects detected at respective locations. For example, lidar intensity data (e.g., a maximum intensity, a minimum intensity, an average intensity, a median intensity, an intensity histogram, or an array of intensities) for points that have been projected onto a cell may be associated with the cell.

The technique 100 includes inputting the birds-eye-view map to a machine learning system in operation 130 to obtain a classified map wherein the one or more objects are labeled with respective classifications from a set of classes including a dynamic class and static class. For example, the machine learning system may include a convolutional neural network. The birds-eye-view map may be input to a convolutional neural network in operation 130 to obtain a classified map in which the one or more objects are labeled with respective classifications from a set of classes including a dynamic class and static class. For example, the convolutional network may be the convolutional neural network 700 of FIG. 7. For example, the classified map may be in the format of the classified map 900 of FIG. 9. In some implementations, the set of classes includes a ground class, which may be interpreted as labeling an object as being part of the ground in the environment near the lidar sensor. The machine learning system may have been trained using labeled birds-eye-view maps to perform the classification of detected objects. For example, the machine learning system may have been trained using a technique 300 of FIG. 3, as will be described herein.

The technique 100 includes storing, transmitting, or displaying the classified map in operation 140. For example, the classified map may be stored in a memory or other data storage device (e.g., the data storage device 520 or the data storage device 620) in operation 140. In some implementations, the classified map may be transmitted (e.g., using the wireless networking interface 490 or the wireless interface 630) in operation 140. For example, the classified map may be displayed in a user interface (e.g., the user interface 640).

The technique 100 includes passing the classified map to a map localizer (e.g., the map localizer 480) that is configured to update a navigation map based on local sensor data in operation 150. The map localizer may update the navigation map based at least in part on the classified map. For example, one or more objects that have classified as static may correspond to barriers (e.g., walls, fences, medians, guard rails, or curbs) and these barriers may be correlated with boundaries in or other features in navigation map. Discrepancies between the locations of barriers and expected locations of the barriers may be used to update the navigation map for a local area near the current location of the lidar sensor. Updating the navigation map may improve navigation of a vehicle.

The technique 100 includes passing the classified map to an object tracker that is configured to track dynamic objects moving in an environment in operation 160. The object tracker may utilize the classified map to identify dynamic objects that need to be tracked and ignore static objects (e.g., barriers) that are not moving themselves and therefore unlikely to move in unexpected ways in relation a vehicle on which the lidar sensor may be mounted. Focusing the computing resources of the object tracker on the dynamic objects detected may improve the efficiency of object tracking and/or enable improved object tracking.

The technique 100 includes determining a motion plan based in part on the object tracking data from the object tracker in operation 170. For example, object tracking data may include projected paths for dynamic objects, which may be used to determine a motion plan for collision avoidance or passing in operation 170. For example, the motion plan may be determined in operation 170 by the automated controller 440 of FIG. 4.

The technique 100 includes outputting commands to actuators to maneuver a vehicle in operation 180, wherein the commands are based on the motion plan. For example, commands may be output in operation 180 to a power source and transmission system (e.g., the power source and transmission system 422), a steering system (e.g., the steering system 424), and/or a braking system (e.g., the braking system 426). For example, the commands may be output in operation 180 by the automated controller 440, the vehicle controller 500, or the computing device 600. For example, the commands may be output in operation 180 via the controller interface 540, or the wireless interface 630. For example, maneuvering the vehicle may include accelerating, turning, and/or stopping.

Figure 2:
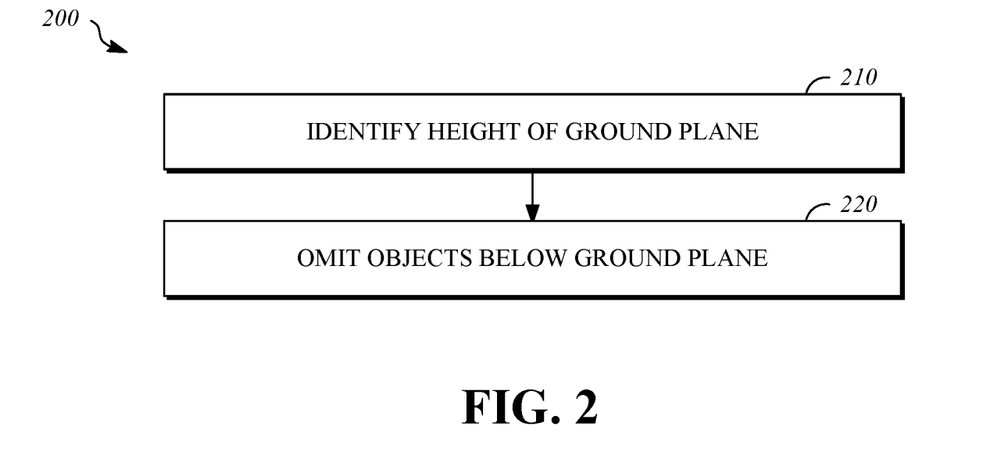
FIG. 2 is a flowchart of an example technique for omitting objects below a ground plane from a birds-eye-view map of an environment.

FIG. 2 is a flowchart of an example technique 200 for omitting objects below a ground plane from a birds-eye-view map of an environment. The technique 200 includes identifying a height of a ground plane in a three-dimensional representation of a space near the lidar sensor in operation 210; and omitting objects that are below the ground plane from the birds-eye-view map in operation 220. For example, the technique 200 may be implemented by a vehicle, such as the vehicle 400 of FIG. 4. For example, the technique 200 may be implemented by a vehicle controller, such as the vehicle controller 500 of FIG. 5. For example, the technique 200 may be implemented by a computing device, such as the computing device 600 of FIG. 6.

The technique 200 includes identifying a height of a ground plane in a three-dimensional representation of a space near a lidar sensor in operation 210. In some implementations, the ground plane may be defined in relation to axes of the lidar sensor or a vehicle the lidar sensor is mounted on. For example, the height of the ground plane may be determined in operation 210 based on an offset that is configured and/or calibrated based on a mounting of the lidar sensor on a vehicle. For example, the height of a ground plane may be determined in operation 210 based on map data, including elevation data for an area near a current location of the lidar sensor (e.g., determined based on global positioning system signals). In some implementations, the height of a ground plane may be determined in operation 210 based on a segmentation of three-dimensional point cloud data from the lidar sensor. For example, the segmentation may be performed based on lidar intensity values, normals, and/or position in relation to an initial ground plane estimate based on position in relation to the lidar sensor and/or map data.

The technique 200 includes omitting objects that are below the ground plane from the birds-eye-view map in operation 220. Objects (e.g., represented by clusters of points in a three-dimensional point cloud from the lidar sensor) that below (e.g., all points associated with the object are at heights less than or equal to the height of the ground plane) may be omitted from the birds-eye-view map in operation 220. In some implementations, all points from a three-dimensional point cloud from the lidar sensor that are below the height of the ground plane are omitted from the birds-eye-view map in operation 220. For example, a point from a three-dimensional point cloud from the lidar sensor may be omitted by not projecting the point onto the plane of the birds-eye-view map.

Figure 3:
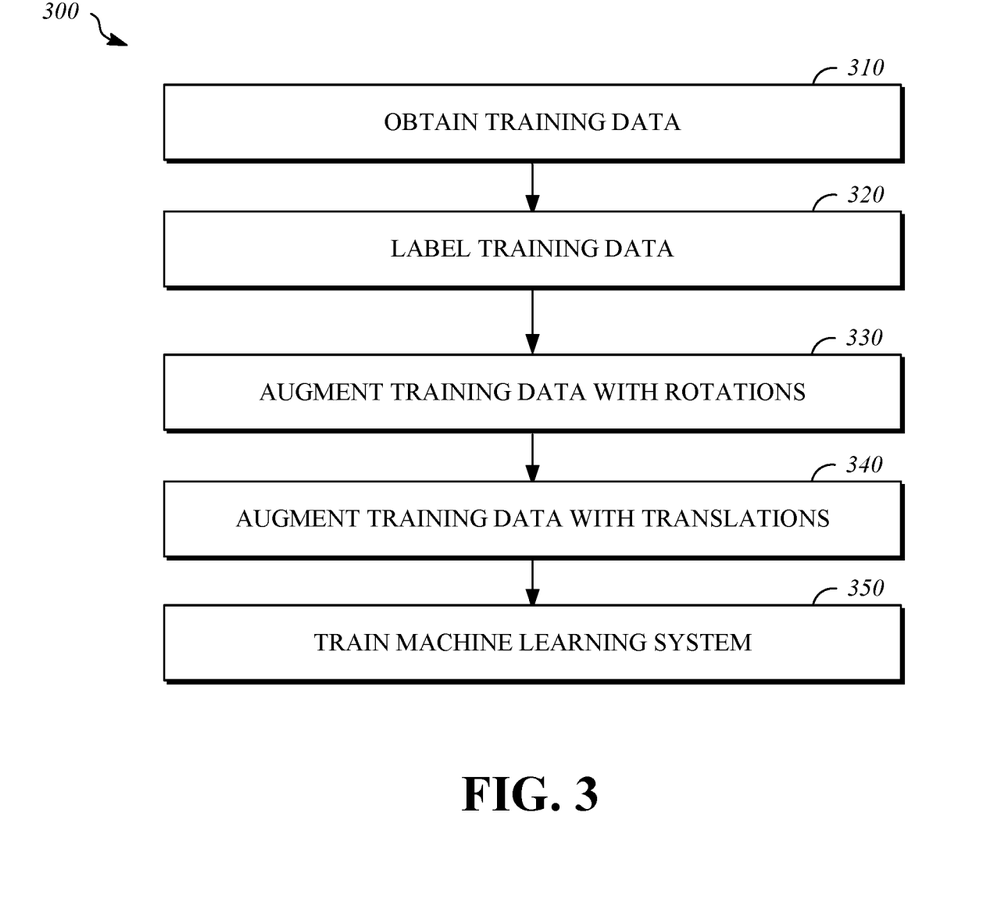
FIG. 3 is a flowchart of an example technique for training a machine learning system to classify objects reflected in a birds-eye-view map of an environment.

FIG. 3 is a flowchart of an example technique 300 for training a machine learning system to classify objects reflected in a birds-eye-view map of an environment. The technique 300 includes obtaining training data for a machine learning system in operation 310; labeling the training data using class labels in operation 320 (e.g., including static and dynamic); augmenting the training data with rotations in operation 330; augmenting the training data with translations in operation 340; and training the machine learning system in operation 350. For example, the technique 300 may be implemented by a vehicle, such as the vehicle 400 of FIG. 4. For example, the technique 300 may be implemented by a vehicle controller, such as the vehicle controller 500 of FIG. 5. For example, the technique 200 may be implemented by a computing device, such as the computing device 600 of FIG. 6.

The technique 300 includes obtaining training data for a machine learning system in operation 310. For example, the machine learning system may include a convolutional neural network (e.g., the convolutional neural network 700 of FIG. 7). For example, the training data may include examples of birds-eye-view maps that have been determined (e.g., as described in relation to operation 120 of FIG. 1) based on lidar data captured with a lidar sensor. For example, the birds-eye-view maps may be in the format of the birds-eye-view map 800 of FIG. 8.

The technique 300 includes labeling the training data with class labels (e.g., static, dynamic, and/or ground) in operation 320. For example, the labels may be applied to individual elements of the birds-eye-view maps. In some implementations, elements of the birds-eye-view map are segmented into groups that are likely to correspond to objects and the labels are applied to a data structure (e.g., a list or array) of objects that can be mapped (e.g., using a list or one or more ranges of element locations) to respective sets of elements of the birds-eye-view map that are associated with a respective object.

The technique 300 includes augmenting training data (e.g., birds-eye-view maps) by applying rotations to derive additional training data in operation 330. For example, a set of rotations may be applied to birds-eye-view maps (e.g., along with their corresponding labels) in a range of rotation angles (e.g., every 5 degrees between plus and minus 30 degrees) about an axis perpendicular to the plane of a birds-eye-view map. For example, this approach may be used to expand the set of training data by a factor equal to the number of rotation angles in the set of rotation angles and improve the robustness of the machine learning system after training in operation 350.

The technique 300 includes augmenting training data (e.g., birds-eye-view maps) by applying translations to derive additional training data in operation 340. For example, a set of translations may be applied to birds-eye-view maps (e.g., along with their corresponding labels) in a range of translations distances (e.g., every four feet between plus and minus 20 feet) and in various directions (e.g., longitudinal translations and/or lateral translations). For example, this approach may be used to expand the set of training data by a factor equal to the number of translations in the set of translations and improve the robustness of the machine learning system after training in operation 350.

The technique 300 includes training the machine learning system (e.g., a convolutional neural network) using the labeled and augmented training data in operation 350. For example, a training algorithm based on back propagation may be used to train the machine learning system in operation 350. In some implementations, the errors for elements of birds-eye-view map that are not associated with a detected object (e.g., no points have been projected onto a corresponding cell of the plane of the birds-eye-view map) are suppressed to reduce training noise and improve or accelerate convergence of the learning algorithm. For example, errors for these empty elements of a birds-eye-view map may be suppressed by applying a mask to the error signal, where the mask has zeros in positions corresponding to empty elements of the birds-eye-view mask.

Figure 4:
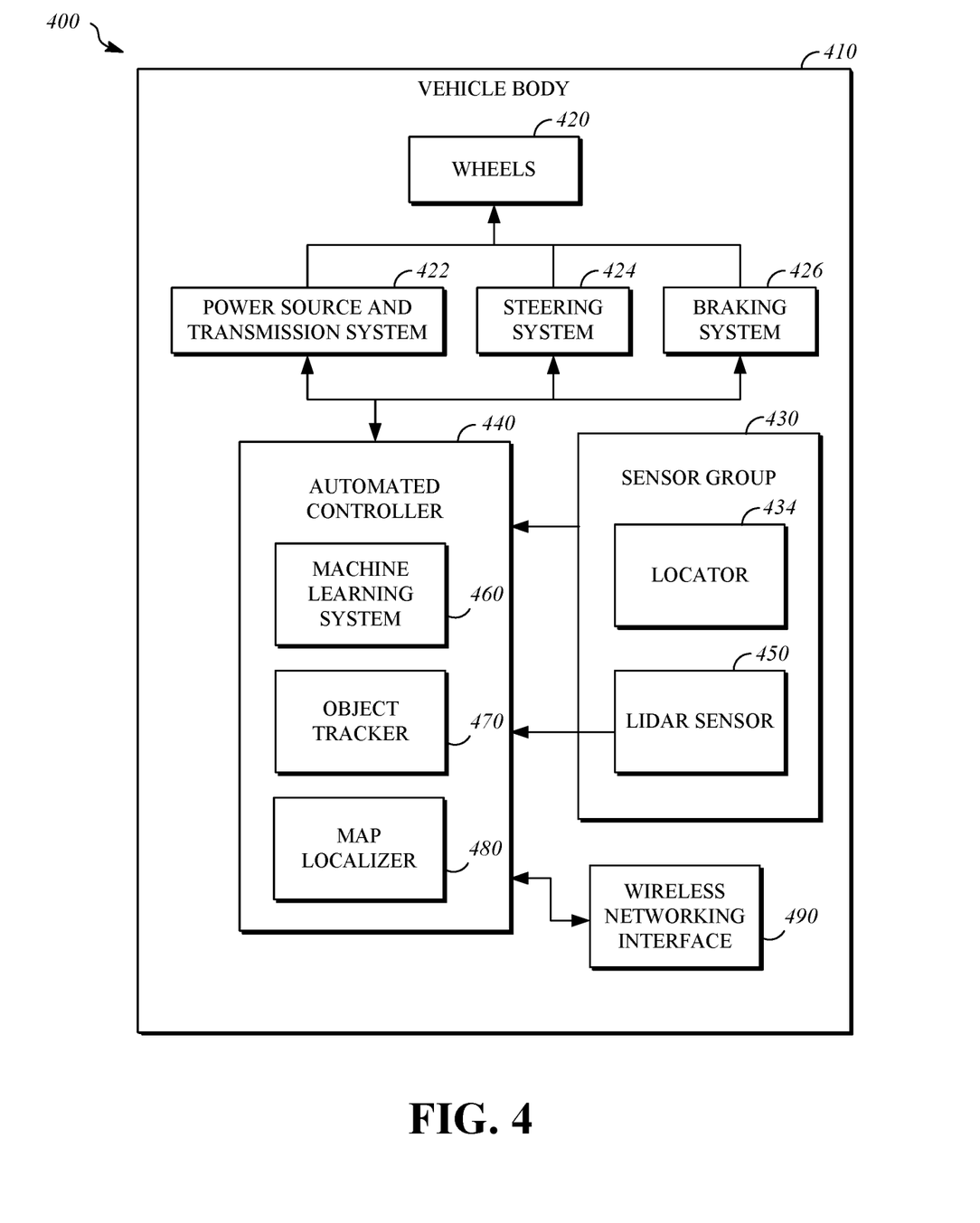
FIG. 4 is a block diagram of an example of a vehicle configured for barrier detection.

FIG. 4 is a block diagram of an example of a vehicle 400 configured for barrier detection. The vehicle 400 includes a vehicle body 410 that contains or is attached to the other systems and components of the vehicle 400. The vehicle 400 includes wheels 420 that are capable of serving as an interface between the vehicle 400 and a road. The wheels 420 provide control surfaces that may be used to guide the vehicle along paths on a road. The vehicle 400 includes actuators operable to cause motion of the vehicle body 410. The actuators include a power and transmission system 422, a steering system 424, and a braking system 426. The vehicle 400 includes a sensor group 430 for sensing an environment near the vehicle 400. The vehicle 400 includes an automated controller 440 configures to maneuver the vehicle, based on sensor data from the sensor group 430, by sending control signals to the actuators (e.g., the power and transmission system 422, the steering system 424, and/or the braking system 426). For example, the vehicle 400 may use the automated controller 440 to implement the technique 100 of FIG. 1.

The vehicle 400 includes a power source (e.g., a combustion engine and/or a battery) connected to the wheels via a transmission system 422 capable of spinning the wheels to accelerate the vehicle along a road. The vehicle 400 includes a steering system 424 capable of turning the wheels 420 in relation to the vehicle body 410 to direct the motion of the vehicle, e.g., by controlling the yaw angle and angular velocity or path curvature of the vehicle.

The vehicle 400 includes a sensor group 430, configured to detect other objects near the vehicle. The sensor group 430 includes a locator 434 configured to determine a current location of the vehicle 400 (e.g., using a global positioning system receiver and/or an inertial measurement unit). The sensor group 430 includes a lidar sensor 450 configured to detect objects in a space near the vehicle. For example, the lidar sensor 450 may scan the space near the vehicle using a pulsed laser (e.g., in an ultraviolet, visible, or near infrared spectrum) and detect backscattered or reflected pulses using one or more photodetectors (e.g., a photo diode, or a photo multiplier). In some implementations, the lidar sensor uses an array of high speed detectors and a modulation sensitive detector array to image a space near the vehicle. For example, the lidar sensor may use homodyne detection with an electronic charge coupled device or complementary metal-oxide-semiconductor shutter to image a three-dimensional space near the vehicle. Delays between emission of a pulse and reception of a corresponding backscattered or reflected pulse may be measured and used to determine distances of detected objects. The lidar sensor may output lidar data, including a sequence of three-dimensional point clouds that reflect the presences of objects in the space near the vehicle 400. In some implementations, the sensor group 430 includes one or more visible spectrum cameras mounted around the vehicle 400. In some implementations, the sensor group 430 includes a radar system.

The vehicle 400 includes an automated controller 440 that is configured to receive data from the sensor group 430 and possibly other sources (e.g., a vehicle passenger/operator control interface) and process the data to implement automated control of the motion of the vehicle 400 by sending control signals to actuators (e.g., the Power source & transmission system 422, the steering system 424, and the braking system 426) that actuate by these commands via the wheels 420 to maneuver the vehicle 400. In some implementations, the automated controller 440 is configured to detect barriers in a space near the vehicle to inform control of the vehicle 400. For example, the automated controller 440 may be configured to implement process 100 as described in relation to FIG. 1. The automated controller 440 may include specialized data processing and control hardware and/or software running on a data processing apparatus with additional capabilities.

The automated controller 440 includes or interfaces with a machine learning system 460 that is configured to process birds-eye-view maps of objects reflected in lidar data to determine classified maps, in which the objects are labeled with respective classifications from a set of classes including a dynamic class and static class. For example, the machine learning system 460 may accept birds-eye-view maps in the format of the birds-eye-view map 800 of FIG. 8 as input and the machine learning system 460 may output a corresponding classified map in the format of the classified map 900 of FIG. 9. In some implementations, the set of classes also includes a ground class. For example, the machine learning system 460 may include a convolutional neural network, such as the convolutional neural network 700 described in relation to FIG. 7. The machine learning system 460 may include specialized data processing and control hardware and/or software running on a data processing apparatus with additional capabilities.

The automated controller 440 includes or interfaces with an object tracker 470 that is configured to track dynamic objects moving in an environment. The automated controller 440 may pass classified maps to the object tracker 470 to facilitate the focusing of limited computing resources on tracking dynamic objects, rather than tracking all detected objects. The object tracker 470 may include specialized data processing and control hardware and/or software running on a data processing apparatus with additional capabilities.

The automated controller 440 includes or interfaces with a map localizer 480 that is configured to update a navigation map based on local sensor data. The automated controller 440 may pass classified maps to the map localizer 480 to facilitate updating a navigation map. The map localizer 480 may include specialized data processing and control hardware and/or software running on a data processing apparatus with additional capabilities.

The vehicle 400 includes a wireless networking interface 490. For example, the wireless networking interface 490 may be used to transmit a birds-eye-view map and/or a classified map to another device (e.g., a user's personal computing device). For example, wireless networking interface 490 may be configured to transmit and receive signals according to a wireless networking standard (e.g., Bluetooth, ZigBee, Wi-Fi or WiMAX).

Figure 5:
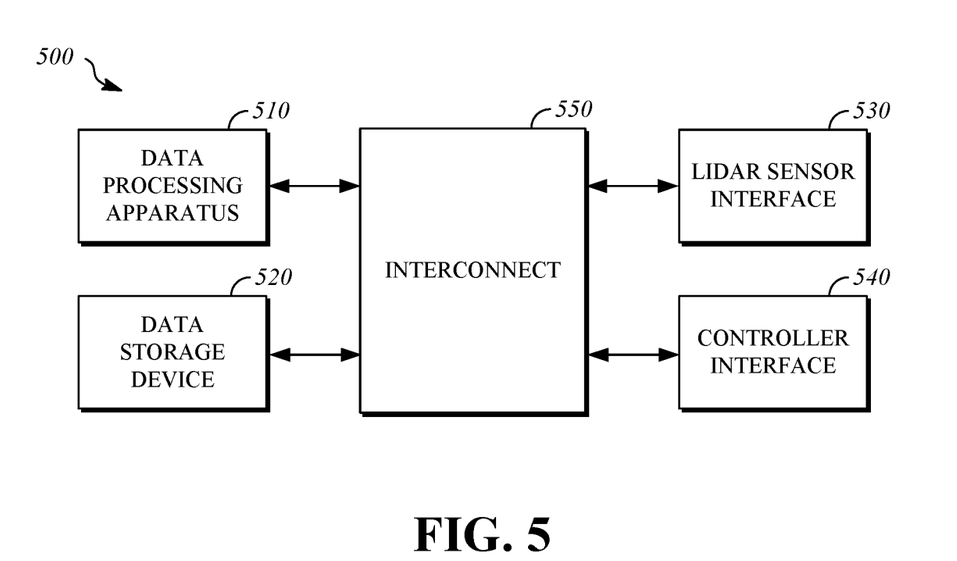
FIG. 5 is a block diagram of an example of a hardware configuration for a vehicle controller.

FIG. 5 is a block diagram of an example of a hardware configuration for a vehicle controller 500. The hardware configuration may include a data processing apparatus 510, a data storage device 520, a lidar sensor interface 530, a controller interface 540, and an interconnect 550 through which the data processing apparatus 510 may access the other components. For example, the vehicle controller 500 may be configured to implement the technique 100 of FIG. 1.

The data processing apparatus 510 is operable to execute instructions that have been stored in a data storage device 520. In some implementations, the data processing apparatus 510 is a processor with random access memory for temporarily storing instructions read from the data storage device 520 while the instructions are being executed. The data processing apparatus 510 may include single or multiple processors each having single or multiple processing cores. Alternatively, the data processing apparatus 510 may include another type of device, or multiple devices, capable of manipulating or processing data. For example, the data storage device 520 may be a non-volatile information storage device such as a hard drive, a solid-state drive, a read-only memory device (ROM), an optical disc, a magnetic disc, or any other suitable type of storage device such as a non-transitory computer readable memory. The data storage device 520 may include another type of device, or multiple devices, capable of storing data for retrieval or processing by the data processing apparatus 510. For example, the data storage device 520 can be distributed across multiple machines or devices such as network-based memory or memory in multiple machines performing operations that can be described herein as being performed using a single computing device for ease of explanation. The data processing apparatus 510 may access and manipulate data in stored in the data storage device 520 via interconnect 550. For example, the data storage device 520 may store instructions executable by the data processing apparatus 510 that upon execution by the data processing apparatus 510 cause the data processing apparatus 510 to perform operations (e.g., operations that implement the technique 100 of FIG. 1).

The lidar sensor interface 530 may be configured to control and/or receive lidar data (e.g., three-dimensional point clouds) from one or more lidar sensors (e.g., the lidar sensor 450). In some implementations, the lidar sensor interface 530 may implement a serial port protocol (e.g., I2C or SPI) for communications with one or more sensor devices over conductors. In some implementations, the lidar sensor interface 530 may include a wireless interface for communicating with one or more sensor groups via low-power, short-range communications (e.g., using a vehicle area network protocol).

The controller interface 540 allows input and output of information to other systems within a vehicle to facilitate automated control of the vehicle. For example, the controller interface 540 may include serial ports (e.g., RS-232 or USB) used to issue control signals to actuators in the vehicle (e.g., the power source and transmission system 422, the steering system 424, and the braking system 426) and to receive sensor data from a sensor group (e.g., the sensor group 430. For example, the interconnect 550 may be a system bus, or a wired or wireless network (e.g., a vehicle area network).

Figure 6:
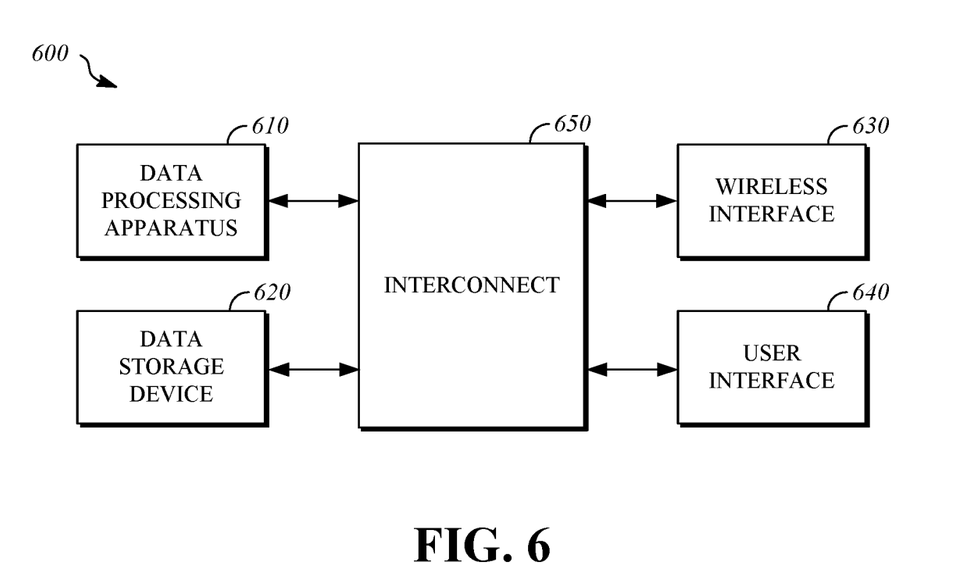
FIG. 6 is a block diagram of an example of a hardware configuration of a computing device.

FIG. 6 is a block diagram of an example of a hardware configuration of a computing device 600. The hardware configuration may include a data processing apparatus 610, a data storage device 620, wireless interface 630, a user interface 640, and an interconnect 650 through which the data processing apparatus 610 may access the other components. The computing device may be configured to identify barriers based on lidar data. For example, the computing device 600 may be configured to implement the technique 100 of FIG. 1.

The data processing apparatus 610 is operable to execute instructions that have been stored in a data storage device 620. In some implementations, the data processing apparatus 610 is a processor with random access memory for temporarily storing instructions read from the data storage device 620 while the instructions are being executed. The data processing apparatus 610 may include single or multiple processors each having single or multiple processing cores. Alternatively, the data processing apparatus 610 may include another type of device, or multiple devices, capable of manipulating or processing data. For example, the data storage device 620 may be a non-volatile information storage device such as a hard drive, a solid-state drive, a read-only memory device (ROM), an optical disc, a magnetic disc, or any other suitable type of storage device such as a non-transitory computer readable memory. The data storage device 620 may include another type of device, or multiple devices, capable of storing data for retrieval or processing by the data processing apparatus 610. For example, the data storage device 620 can be distributed across multiple machines or devices such as network-based memory or memory in multiple machines performing operations that can be described herein as being performed using a single computing device for ease of explanation. The data processing apparatus 610 may access and manipulate data in stored in the data storage device 620 via interconnect 650. For example, the data storage device 620 may store instructions executable by the data processing apparatus 610 that upon execution by the data processing apparatus 610 cause the data processing apparatus 610 to perform operations (e.g., operations that implement the technique 100 of FIG. 1).

The wireless interface 630 facilitates communication with other devices, for example, a vehicle (e.g., the vehicle 400). For example, wireless interface 630 may facilitate communication via a vehicle Wi-Fi network with a vehicle controller (e.g., the vehicle controller 500 of FIG. 5). For example, wireless interface 630 may facilitate communication via a WiMAX network with a vehicle at a remote location.

The user interface 640 allows input and output of information from/to a user. In some implementations, the user interface 640 can include a display, which can be a liquid crystal display (LCD), a cathode-ray tube (CRT), a light emitting diode (LED) display (e.g., an OLED display), or other suitable display. For example, the user interface 640 may include a touchscreen. For example, the user interface 640 may include a head-mounted display (e.g., virtual reality goggles or augmented reality glasses). For example, the user interface 640 may include a positional input device, such as a mouse, touchpad, touchscreen, or the like; a keyboard; or other suitable human or machine interface devices. For example, the interconnect 650 may be a system bus, or a wired or wireless network (e.g., a vehicle area network).

Figure 7:
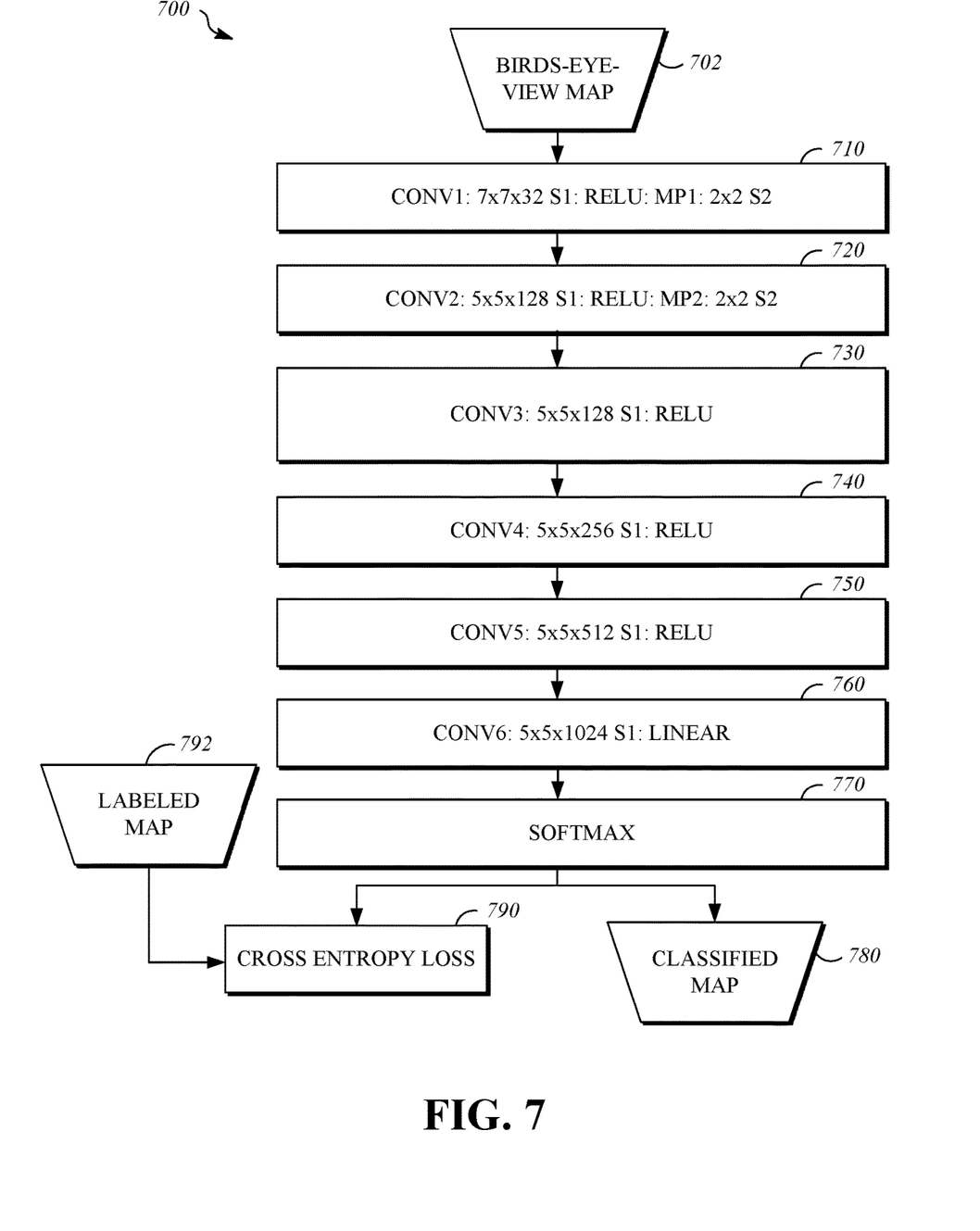
FIG. 7 is a block diagram of an example of a convolutional neural network for classifying objects reflected in a birds-eye-view map of an environment.

FIG. 7 is a block diagram of an example of a convolutional neural network 700 for classifying objects reflected in a birds-eye-view map of an environment. The convolutional neural network 700 takes a birds-eye-view map 702 as input. For example, the birds-eye-view map 702 may include elements that are binary indications of whether an object is detected at respective locations (e.g., whether there are points from a three-dimensional point cloud of lidar data that have been projected onto a cell of the plane of the birds-eye-view map). In some implementations, the birds-eye-view map 702 may include other information (e.g., height information, point counts, or lidar intensity information) about objects detected at a location in the plane of the birds-eye-view map 702. For example, the birds-eye-view map 702 may include elements that are maximum heights of objects detected at respective locations. For example, the birds-eye-view map 702 may include elements that are height histograms of objects detected at respective locations. For example, the birds-eye-view map 702 may include elements that are point counts of objects detected at respective locations. For example, the birds-eye-view map 702 may include elements that are lidar intensity values for objects detected at respective locations.

The first layer 710 of the convolutional neural network 700 includes thirty-two 7×7 kernels that are convolved with a birds-eye-view map 702 that is input to the convolutional neural network 700. The first layer 710 uses a rectified linear units (ReLU) activation function. The first layer 710 applies max pooling with a 2×2 window to determine a down-sampled, rectified feature map that may be processed by the second layer 720 of the convolutional neural network 700.

The second layer 720 of the convolutional neural network 700 includes one hundred twenty-eight 5×5 kernels that are convolved with the feature map from the first layer 710 of the convolutional neural network 700. The second layer 720 uses a rectified linear units activation function. The second layer 720 applies max pooling with a 2×2 window to determine a down-sampled, rectified feature map that may be processed by the third layer 730 of the convolutional neural network 700.

The third layer 730 of the convolutional neural network 700 includes one hundred twenty-eight 5×5 kernels that are convolved with the feature map from the second layer 720 of the convolutional neural network 700. The third layer 730 uses a rectified linear units activation function. The resulting rectified feature map may be processed by the fourth layer 740 of the convolutional neural network 700.

The fourth layer 740 of the convolutional neural network 700 includes two hundred fifty-six 5×5 kernels that are convolved with the feature map from the third layer 730 of the convolutional neural network 700. The fourth layer 740 uses a rectified linear units activation function. The resulting rectified feature map may be processed by the fifth layer 750 of the convolutional neural network 700.

The fifth layer 750 of the convolutional neural network 700 includes five hundred twelve 5×5 kernels that are convolved with the feature map from the fourth layer 740 of the convolutional neural network 700. The fifth layer 750 uses a rectified linear units activation function. The resulting rectified feature map may be processed by the sixth layer 760 of the convolutional neural network 700.

The sixth layer 760 of the convolutional neural network 700 includes one thousand twenty-four 5×5 kernels that are convolved with the feature map from the fifth layer 750 of the convolutional neural network 700. The sixth layer 760 uses a linear activation function. The resulting feature map may be processed by the seventh layer 770 of the convolutional neural network 700.

The seventh layer 770 of the convolutional neural network 700 includes a softmax classifier that is applied to the feature map from the sixth layer 760 of the convolutional neural network 700. The seventh layer 770 may be a fully connected layer. For example, the seventh layer 770 may include a multi-layer perceptron that uses a softmax activation function in the output layer. The resulting output of the seventh layer 770 is a classified map 780 that is based on the birds-eye-view map 702 that was input to the convolutional neural network 700.

In some implementations, the classified map 780 may include a vector of classification probabilities for a respective element (e.g., corresponding to a cell in the plane) of the birds-eye-view map 702. A vector of probabilities may include a probability that the respective element is of a static class and a probability that the respective element is of a dynamic class. For example, a vector of probabilities may also include a probability that the respective element is of a ground class.

The convolutional neural network 700 uses a cross-entropy loss function 790 for training. The cross-entropy loss function 790 compares a classified map 780 resulting from a birds-eye-view map 702 for a training example to a corresponding labeled map 792 that is the ground truth for the training example from a training data set. The cross-entropy loss function 790 determines an error signal that can be used to train (e.g., using a backpropagation algorithm) the convolutional neural network 700. In some implementations, binary indications of the birds-eye-view map may be applied as a mask to the error signal from the cross-entropy loss function 790 to ignore error signals for empty elements of the current birds-eye-view map. This masking approach may reduce training noise and/or increase the rate of convergence during training. For example, the technique 300 of FIG. 3 may be implemented to train the convolutional neural network 700.

Figure 8:
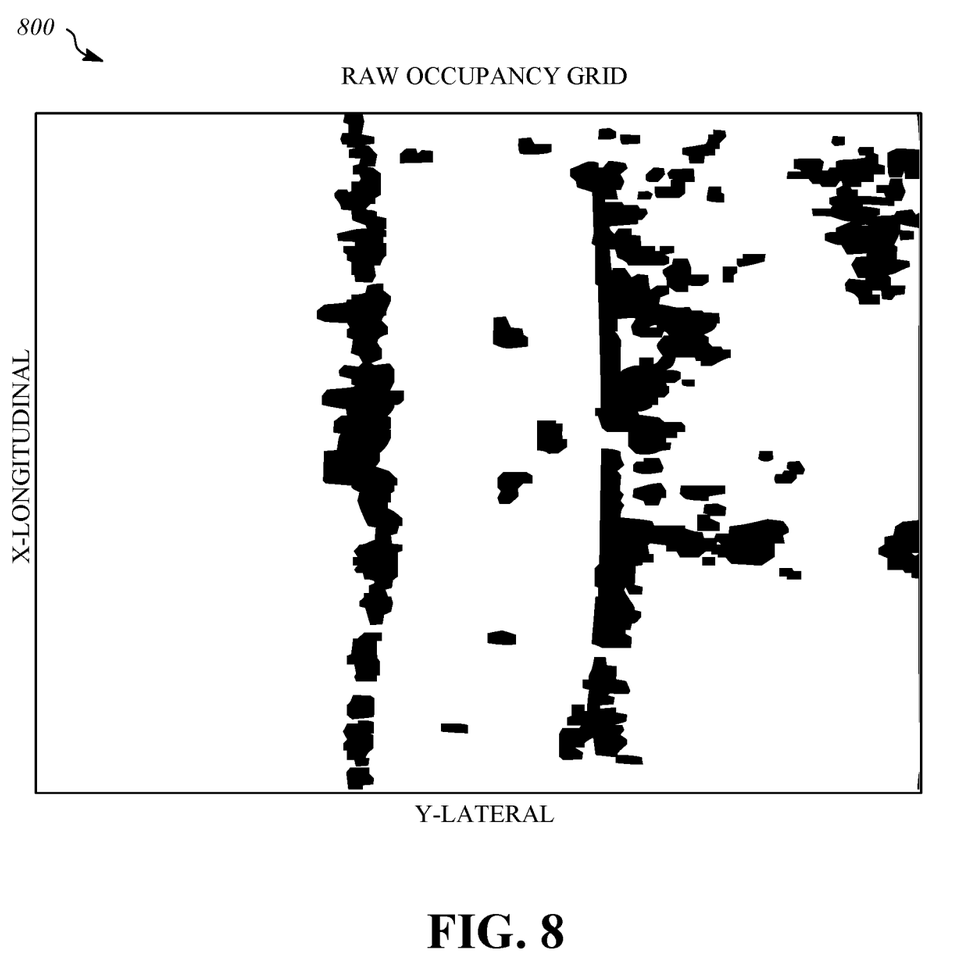
FIG. 8 is a plot of an example of a birds-eye-view map of an environment.

FIG. 8 is a plot of an example of a birds-eye-view map 800 of an environment. The dimensions of the plot correspond to a lateral dimension and a longitudinal dimension in the plane of the birds-eye-view map 800. The birds-eye-view map 800 includes elements that are binary indications of whether an object is detected (e.g., based on lidar data) at respective locations. These binary indications are plotted in FIG. 8 as black for true and white for false, thus the positions of detected objects projected onto the plane of the birds-eye-view map 800 show up in black. For example, the long, roughly parallel strips of black running in the longitudinal direction just left and just right of center may correspond to a curb or some other static barrier along the sides of a road.

Figure 9:
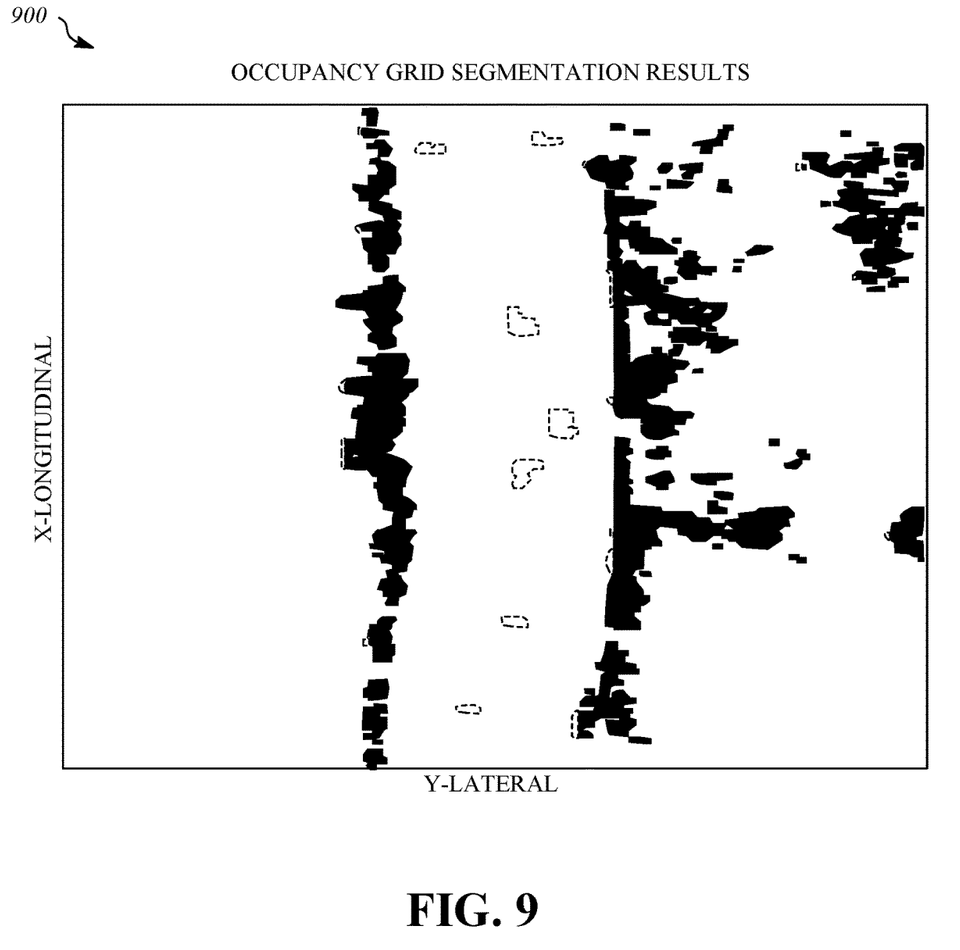
FIG. 9 is a plot of an example of classified map that determined based on a birds-eye-view map of an environment.

FIG. 9 is a plot of an example of classified map 900 that is determined based on the birds-eye-view map 800 of an environment. For example, the classified map 900 may be determined as output of the convolutional neural network 700 that results from inputting the birds-eye-view map 800 to the convolutional neural network 700. The classified map 900 includes probabilities that respective occupied elements of the birds-eye-view map 800 correspond to a static class object or a dynamic class object. In the plot of FIG. 9, the class with the greatest probability is assigned to the corresponding element as a label that is represented by shading: black elements are labeled as static and elements surrounded by dashed line outlines are labeled as dynamic. For example, the long, roughly parallel strips of black running in the longitudinal direction just left and just right of center may correspond to a curb or some other static barrier along the sides of a road. For example, the irregularly shaped clusters outlined with dashed lines between the barriers may correspond to dynamic objects (e.g., other cars) that are moving on the road. The white elements that lack any border may correspond to unoccupied locations where no objects above a ground plane have been detected.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A vehicle comprising:
a vehicle body;
actuators operable to cause motion of the vehicle body;
a lidar sensor configured to detect objects in a space near the vehicle; and
an automated controller configured to:
receive lidar data from the lidar sensor,
determine, based on the lidar data, a birds-eye-view map of one or more objects that are reflected in the lidar data,
input the birds-eye-view map to a convolutional neural network to obtain a classified map in which the one or more objects are labeled with respective classifications from a set of classes including a dynamic class and static class,
pass the classified map to an object tracker that is configured to track dynamic objects moving in an environment,
determine a motion plan based in part on the object tracking data from the object tracker, and
output commands to the actuators to maneuver the vehicle, wherein the commands are based on the motion plan.

2. The vehicle of claim 1, wherein the automated controller is further configured to:
pass the classified map to a map localizer that is configured to update a navigation map based on local sensor data.

3. A system, comprising:
a lidar sensor;
a data processing apparatus; and
a data storage device storing instructions executable by the data processing apparatus that upon execution by the data processing apparatus cause the data processing apparatus to perform operations comprising:
receiving lidar data from the lidar sensor,
determining, based on the lidar data, a birds-eye-view map of one or more objects that are reflected in the lidar data, and
inputting the birds-eye-view map to a convolutional neural network to obtain a classified map in which the one or more objects are labeled with respective classifications from a set of classes including a dynamic class and static class.

4. The system of claim 3, wherein the operations comprise passing the classified map to an object tracker that is configured to track dynamic objects moving in an environment.

5. The system of claim 3, wherein the operations comprise passing the classified map to a map localizer that is configured to update a navigation map based on local sensor data.

6. The system of claim 3, wherein determining the birds-eye-view map comprises:
identifying a height of a ground plane in a three-dimensional representation of a space near the lidar sensor; and
omitting objects that are below the ground plane from the birds-eye-view map.

7. The system of claim 3, wherein the set of classes includes a ground class.

8. The system of claim 3, wherein the birds-eye-view map includes elements that are binary indications of whether an object is detected at respective locations.

9. The system of claim 3, wherein the birds-eye-view map includes elements that are maximum heights of objects detected at respective locations.

10. The system of claim 3, wherein the birds-eye-view map includes elements that are height histograms of objects detected at respective locations.

11. The system of claim 3, wherein the birds-eye-view map includes elements that are point counts of objects detected at respective locations.

12. The system of claim 3, wherein the birds-eye-view map includes elements that are lidar intensity values for objects detected at respective locations.

13. The system of claim 3, wherein the convolutional neural network has been trained using birds-eye-view maps that have been augmented by applying rotations or translations to derive additional training data.

14. A method comprising:
receiving lidar data from a lidar sensor;
determining, based on the lidar data, a birds-eye-view map of one or more objects that are reflected in the lidar data; and
inputting the birds-eye-view map to a machine learning system to obtain a classified map wherein the one or more objects are labeled with respective classifications from a set of classes including a dynamic class and static class.

15. The method of claim 14, comprising:
passing the classified map to an object tracker that is configured to track dynamic objects moving in an environment.

16. The method of claim 14, comprising:
passing the classified map to a map localizer that is configured to update a navigation map based on local sensor data.

17. The method of claim 14, wherein determining the birds-eye-view map comprises:
identifying a height of a ground plane in a three-dimensional representation of a space near the lidar sensor; and
omitting objects that are below the ground plane from the birds-eye-view map.

18. The method of claim 14, wherein the set of classes includes a ground class.

19. The method of claim 14, wherein the birds-eye-view map includes elements that are binary indications of whether an object is detected at respective locations.

20. The method of claim 14, wherein the machine learning system includes a convolutional neural network.

\* \* \* \* \*